Dec. 28, 1965  J. MARGOLIS  3,226,094
WARMING AND SHAKING APPARATUS
Filed July 13, 1964
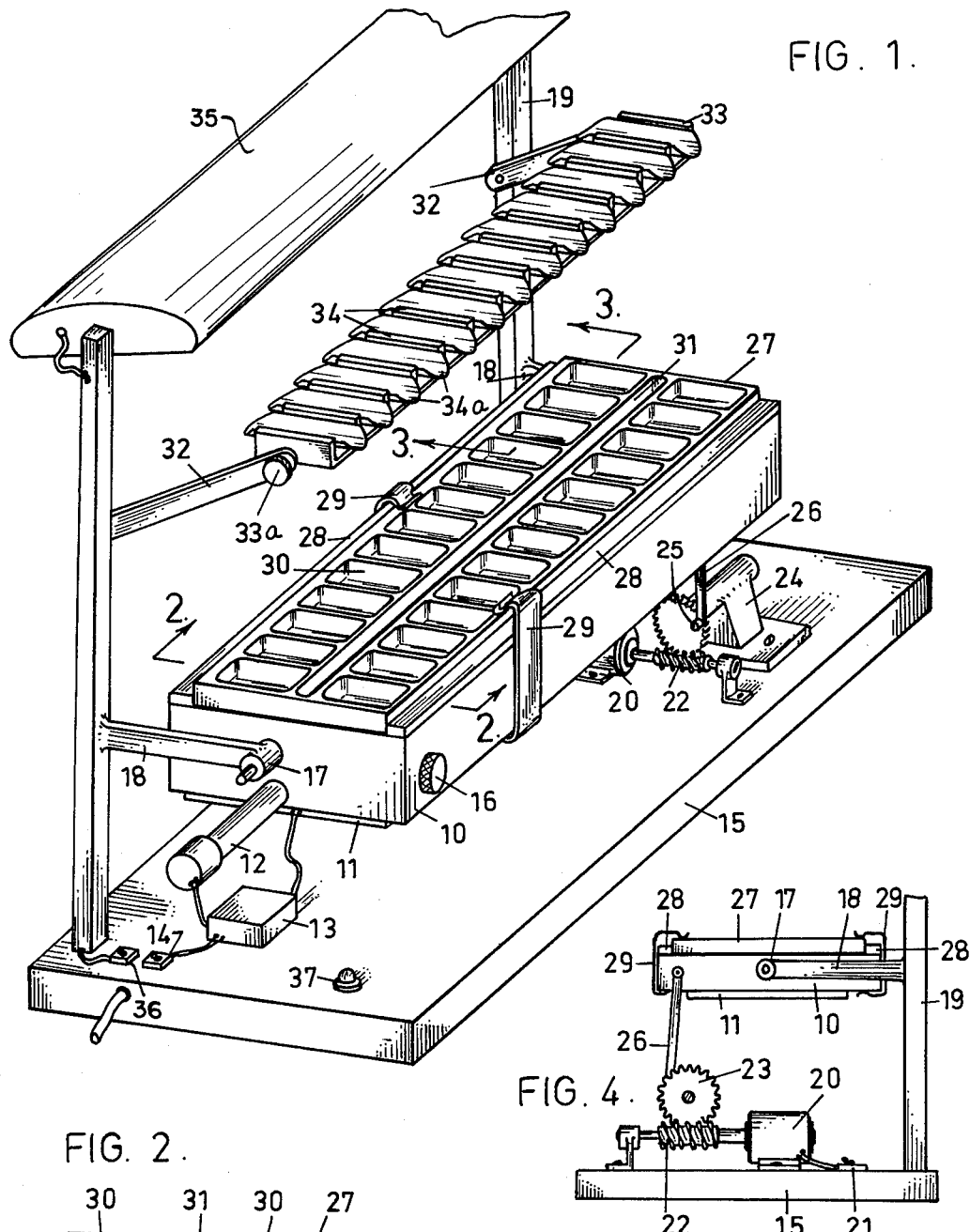
FIG. 1.
FIG. 2.
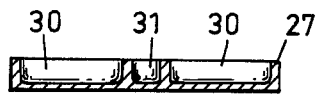
FIG. 3.
FIG. 4.

United States Patent Office 3,226,094
Patented Dec. 28, 1965

---

3,226,094
WARMING AND SHAKING APPARATUS
Joel Margolis, Camperdown, New South Wales, Australia, assignor to The Royal Alexandra Hospital for Children, New South Wales, Australia, a body corporate of New South Wales
Filed July 13, 1964, Ser. No. 382,317
Claims priority, application Australia, Aug. 1, 1963, 33,743/63
2 Claims. (Cl. 259—13)

This invention relates to apparatus for warming and shaking a number of separate samples or portions of material at the same time.

The invention has its primary utility in the sphere of testing equipment, although it is not necessarily limited thereto.

With many medical, biological and chemical tests it is necessary to warm a sample and shake or stir it at the same time. Examples are, blood grouping procedures, testing body fluids, biochemical tests and ordinary chemical laboratory testing with specific qualitative reagents.

Usually, hitherto, such tests have been carried out in test tubes and there are various thermostatically controlled vessels employed for warming any number of test tubes, and various mechanical appliances for shaking one or more test tubes.

Such arrangement, however, is not readily adaptable to carrying out a large number of tests simultaneously, as for example testing blood coagulation times or specific agglutination of blood from a considerable number of subjects in connection with school medical services, hospital clinics, blood banks or the like.

Accordingly, it is the object of the present invention to provide novel apparatus whereby a considerable number of samples of blood, body fluids or chemicals may be warmed and gently shaken simultaneously.

A further object is to facilitate the handling of such samples and the reading of results of reactions carried out thereupon.

The present invention relates to apparatus for simultaneously warming and shaking a number of samples comprising at least one tray divided into a plurality of separate liquid-holding compartments, and a warming device to which said tray can be detachably secured and whereby it may be warmed, said warming device being associated with means whereby it may be tilted repeatedly to and fro or otherwise reciprocated so as to effect a gentle shaking action of the contents of the compartments in the tray.

Preferably the apparatus of the invention comprises a chamber which is mounted for tilting about a horizontal axis together with means to tilt it repeatedly to and fro; means to heat water or other liquid in said chamber and a flat top to the chamber with means to clamp against such flat top at least one tray of thermally conductive material divided into a plurality of liquid-holding cells or compartments.

Further preferred features of this invention will be apparent from the following description of a preferred embodiment thereof which will now be given by way of exemplification and by reference to the accompanying drawings, in which:

FIGURE 1 is a general view of the aforesaid embodiment;

FIGURES 2 and 3 are partial sectional elevations on the lines 2—2 and 3—3 of FIGURE 1; and FIGURE 4 is a partial end view of the said embodiment.

In this instance a closed metallic chamber 10 is provided. This is rectangular in plan and shallow relative to its length and width. It is provided with an external electrical pressure strip heater 11. This heater is quite small, in this instance being of only 100 watts. There is a thermostat 12 mounted in the interior of the chamber 10. This controls said heater through a suitable relay 13 and there is also a switch 14 mounted upon a base 15 which carries the main part of the apparatus to switch said heater and thermostat on and off.

There is a spout 16 for introducing water or other liquid into the interior of the chamber 10, and for emptying it therefrom, with a suitable removable closure for such spout.

The chamber 10 is mounted upon two horizontal pivots 17 at its ends on its longitudinal axis. These enter supports 18 (which if desired may be adjustable in length and/or height) extending from columns 19 carried by the base 15.

The chamber 10 is tilted about the pivots 17 to bring the spout 16 upwards for filling and downwards for emptying. The chamber does not need to be quite full of liquid as the latter will slosh against its flat top as the chamber rocks (as described below). In any case the chamber 10 is made from thin thermally conductive metal and its top is speedily warmed by the heater 11.

Any convenient means may be employed for rocking the chamber as, for example, any suitable crank arm, an adjustable eccentric or a cam.

In the construction illustrated the chamber 10 is rocked continuously while the apparatus is in service, as follows:

On the base plate 15 is an electric motor 20 controlled by a switch 21. This motor drives a worm 22 in mesh with a worm wheel 23 carried by a support 24. On this worm wheel 23 is a crank pin 25. Desirably either the motor 20 is controllable in speed or the crank pin 25 is adjustable in throw, or both.

A link 26 (which may be adjustable in length) is pivoted to the chamber 10 at one end and at its other end is journalled on the crank pin 25. Therefore, as the worm wheel 23 rotates the chamber 10 is rocked gently and continuously about the pivots 17.

There is at least one tray 27, which conveniently is an aluminum die casting, and which may be clipped or otherwise detachably secured to the top face of the warming chamber 10. In this instance the tray 27 is slid between longitudinal ridges 28 on top of the chamber 10 and held to the top of the latter by C-slips 29 of resilient metal, but any other convenient means for detachably securing it may be employed.

The tray 27 in the present example, is some nine inches long, three inches wide and ⅜ of an inch deep. The size may be varied however, as desired.

There may be any desired number of these trays 27, if the warming chamber 10 is large enough two or more may be mounted thereon at once. In any case, while one or more is or are being warmed and rocked, one or more others may be being prepared with samples of blood, body fluids, chemicals to be tested, reagents etc., thus greatly speeding up operations.

In the present instance the trays 27 each are in the form of aluminum diecasting comprising some 26 reaction cells 30 arranged in two rows of thirteen each along the longer sides of the tray 27 and separated from one another by an elongated central recess 31 adapted to hold water and a thermometer.

The cells 30 are open at their tops but watertight so far as passage of liquid from one cell to another, or from the central recess 31 to a cell 30, is concerned. Desirably all the inside corners of the cells are rounded (as shown in FIGURES 2 and 3) to facilitate cleaning and, if desired, sterilizing. They may if desired be painted or lined with light coloured plastic to facilitate observation of colour changes therein.

According to an optional feature of the invention there may be mounted also above the warming chamber and any tray or trays thereon, a device containing a plurality of compartments corresponding in number and position to the compartments in the tray, or trays, and adapted all simultaneously to discharge a predetermined quantity of a reagent into the cells when the latter are at the desired temperature.

As illustrated there are arms 32 pivoted to the upper parts of columns 19 and extending out over the chamber 10. A diecasting 33 is pivotally mounted in the ends of these arms 32. Thus it may be swung down to near the tray 27 or up out of the way and also tilted either way about its horizontal longitudinal axis. The pivotal mountings are sufficiently stiff to prevent accidental tilting.

This diecasting 33 is formed with a plurality of transverse open-ended compartments 34. These are provided with concave and protruding water-repellent plastic liners 34a (for example made of the material sold under the registered trademark "Teflon"). There are as many of them as there are compartments 30 in each row in the tray 27, in this case 13.

Instead of providing a diecasting 33 with plastic liners a unitary plastic moulding may be provided. A measured volume of reagent is placed in each of the compartments 34 from a graduated pipette and remains on the liner in the form of a drop. The arms 32 are swung down and the diecasting 33 is tilted by the knobs 34b, say forwards, when each drop simultaneously rolls off the water-repellent plastic liner 34a of the compartment 34 into one of the front row compartments 30 of the tray 27. Next time the diecasting 33 is tilted backwards and drops of reagent are added simultaneously to all the compartments in the rear row of the tray 27.

At the tops of the columns 19 is pivotally mounted a lamp-holder 35 containing a tubular or fluorescent lamp controlled by a switch 36 upon the base plate 15.

Stop-clock or other timing means (not shown) to record the time of agglutination or any final colour-change or the like in the various samples contained in the different cells 30 may also be provided upon the base 15.

All cells 30 are visible at all times, so that agglutination, colour change or like events can readily be observed and timed, and the times taken by the contents of each cell compared with one another, if so desired.

An indicator light 37 to show when the heater 11 is switched on may also be provided, if desired.

What I claim is:

1. Apparatus for simultaneously warming and shaking a number of samples consisting of at least one tray divided into a plurality of separate liquid holding compartments, and a warming device, means detachably to secure said tray to said warming device, and means to move said warming device repeatedly so as to effect a gentle shaking action of the contents of the compartments in the tray, together with a device formed of a die casting comprising a plurality of transverse compartments each of which is open at each end and each having a plastic liner therein.

2. Apparatus for simultaneously warming and shaking a number of samples consisting of the combination of a chamber and a tray formed of thermally conductive material, said chamber being mounted for tilting movement about a horizontal axis together with means to tilt it repeatedly to and fro, means to heat water and other liquids in said chamber, said chamber being provided with a flat upper surface, means for detachably clamping said tray to said surface, said tray being divided into a plurality of liquid holding compartments, together with a device formed of a die casting and tiltably mounted above the warming chamber and tray thereon, said device containing a plurality of transverse compartments each open at each end and provided with a plastic liner, whereby tilting of said device will discharge a predetermined quantity of a reagent from each compartment of said device into one of the compartments of said tray.

References Cited by the Examiner

UNITED STATES PATENTS

| | | | |
|---|---|---|---|
| 678,699 | 7/1901 | Thomas | 141—239 |
| 775,059 | 11/1904 | Wise | 259—17 |
| 2,755,173 | 7/1956 | Shore | 259—72 |
| 2,809,020 | 10/1957 | Magee et al. | 259—72 |

FOREIGN PATENTS 1,284,602  1/1962  France.

WALTER A. SCHEEL, *Primary Examiner.*

ROBERT W. JENKINS, *Assistant Examiner.*